(12) United States Patent
Patwari

(10) Patent No.: US 9,288,245 B2
(45) Date of Patent: Mar. 15, 2016

(54) APPARATUS AND METHODS OF ACCESSING CONTENT

(75) Inventor: Jaiteerth Patwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 12/027,936

(22) Filed: Feb. 7, 2008

(65) Prior Publication Data

US 2009/0204663 A1 Aug. 13, 2009

(51) Int. Cl.
| | |
|---|---|
| G06F 15/16 | (2006.01) |
| H04L 29/06 | (2006.01) |
| H04N 7/173 | (2011.01) |
| H04N 21/239 | (2011.01) |
| H04N 21/266 | (2011.01) |
| H04N 21/4728 | (2011.01) |
| H04N 21/845 | (2011.01) |

(52) U.S. Cl.
CPC ........ *H04L 65/4069* (2013.01); *H04N 7/17318* (2013.01); *H04N 21/2393* (2013.01); *H04N 21/26613* (2013.01); *H04N 21/4728* (2013.01); *H04N 21/8455* (2013.01); *H04N 21/8456* (2013.01); *H04L 67/38* (2013.01)

(58) Field of Classification Search
USPC .......................................................... 709/217
See application file for complete search history.

(56) References Cited

U.S. PATENT DOCUMENTS

| | | | |
|---|---|---|---|
| 5,522,041 A | | 5/1996 | Murakami et al. |
| 7,212,727 B2 * | | 5/2007 | Senoh ............................. 386/68 |
| 7,420,482 B2 * | | 9/2008 | Henry et al. .................... 341/51 |
| 7,469,410 B2 * | | 12/2008 | Evans et al. .................... 719/328 |
| 2002/0059621 A1 * | | 5/2002 | Thomas et al. ................. 725/87 |
| 2002/0165987 A1 | | 11/2002 | Arisaka et al. |
| 2003/0110234 A1 * | | 6/2003 | Egli et al. ...................... 709/217 |
| 2004/0168052 A1 * | | 8/2004 | Clisham et al. ............... 713/153 |
| 2005/0086194 A1 * | | 4/2005 | Suzuki et al. ..................... 707/1 |
| 2007/0198654 A1 * | | 8/2007 | Matsuoka ..................... 709/217 |

FOREIGN PATENT DOCUMENTS

| | | |
|---|---|---|
| CN | 1719892 A | 1/2006 |
| JP | 6326856 A | 11/1994 |
| JP | H1023362 A | 1/1998 |

(Continued)

OTHER PUBLICATIONS

European Search Report—EP08102945—Search Authority—The Hague—Jul. 29, 2009.

(Continued)

*Primary Examiner* — Hua Fan
(74) *Attorney, Agent, or Firm* — Won Tae C. Kim

(57) ABSTRACT

Apparatus and methods for accessing electronic content include a server system, a first communication device, and a second communication device. The server system is operable to receive a marker request initiated by the first communication device, wherein the marker request comprises marker information and data key information. The marker information represents a saved state of content on the first communication device, and the data key information comprises a content identifier corresponding to the content and a user identifier. The server system is then operable to initiate access to the content on the second communication device at the saved state of content on the first communication device based on the marker information and the data key information of the marker request.

10 Claims, 6 Drawing Sheets

(56) References Cited

FOREIGN PATENT DOCUMENTS

| | | | |
|---|---|---|---|
| JP | 2002328949 A | 11/2002 |
| JP | 2003174636 A | 6/2003 |
| JP | 2004013283 A | 1/2004 |
| JP | 2004064330 A | 2/2004 |
| JP | 2004102415 A | 4/2004 |
| JP | 2004159212 A | 6/2004 |
| JP | 2004343445 A | 12/2004 |
| JP | 2005275718 A | 10/2005 |
| JP | 2007228205 A | 9/2007 |
| WO | 2009099849 A2 | 8/2009 |

OTHER PUBLICATIONS

International Search Report and Written Opinion—PCT/US2009/032311, International Search Authority—European Patent Office—Aug. 5, 2009.

* cited by examiner

APPARATUS AND METHODS OF ACCESSING CONTENT

BACKGROUND

1. Field

The invention relates generally to wireless communications, and more particularly, to a method and system of for managing retrieval of content to a first user terminal, marking a location within the content, storing the marker on a server, and retrieving the content to a second user terminal at the marked location within the content.

2. Background

Usage of wireless telephone user terminals and other wireless terminals (herein user terminal, or UT) to access various content, such as internet, ebooks and games, has become commonplace. Using a wireless terminal, a user can access a remote server to retrieve desired content. In the case of a game or digitally stored reading material, such as an ebook, the user downloads the content and uses the content. When the user desires to terminate usage of the content, the remote server may or may not be notified.

In the case of an ebook or a game, the UT can transmit a data key that allows access to the remote server. The UT downloads and stores the ebook, game or other content onto the UT. When the user chooses to terminate present access to the content, the user may, for example, close the application accessing the content on the UT. When the user desires to resume access to the content at the point of last access, the application on the UT resumes the access at the point of last user access.

However, when the user desires to resume use of the content from a second UT, the user must download the entire content. More specifically, if the user accesses the server to download the content to a second UT, the entire content is downloaded without any indication of the place in the content the user was at last access.

Therefore, accessing the same content from more than one UT is problematic.

SUMMARY

System, apparatus, and method of managing access to or use of electronic content are described. The described aspects allow a user to mark the location where the user desires to later resume the content, and store that marker on a server, giving the user the ability to switch between devices and resume access to the content at the marked location.

In one aspect, a method of managing access to electronic content comprises receiving at a server system a marker request initiated by a first communication device. The marker request comprises marker information and data key information, wherein the marker information represents a saved state of content on the first communication device and wherein the data key information comprises a content identifier corresponding to the content and a user identifier. The method further includes saving the marker request at the server system, and determining a match between a requested content identifier and a requester identifier and the content identifier and the user identifier, respectively. The requested content identifier and the requester identifier correspond to a resume content request transmitted by a second communication device. Additionally, the method includes initiating a transmission of the marker information from the server system to a content server or to the second communication device if a match is determined, wherein the marker information is operable to initiate access to the content on the second communication device at the saved state of content on the first communication device.

In another aspect, a computer program product for managing access to electronic content comprises a computer readable medium comprising instructions. The computer readable medium includes at least one instruction for causing a computer to receive a marker request initiated by a first communication device. The marker request comprises marker information and data key information, wherein the marker information represents a saved state of content on the first communication device and wherein the data key information comprises a content identifier corresponding to the content and a user identifier. The computer readable medium further includes at least one instruction for causing the computer to save the marker request, and at least one instruction for causing the computer to determine a match between a requested content identifier and a requester identifier and the content identifier and the user identifier, respectively. The requested content identifier and the requestor identifier correspond to a resume content request transmitted by a second communication device. Additionally, the computer readable medium further includes at least one instruction for causing the computer to initiate a transmission of the marker information to a content server or to the second communication device if a match is determined, wherein the marker information is operable to initiate access to the content on the second communication device at the saved state of content on the first communication device.

In a further aspect, at least one processor configured to manage access to electronic content comprises a first module for receiving a marker request initiated by a first communication device, wherein the marker request comprises marker information and data key information. The marker information represents a saved state of content on the first communication device, and the data key information comprises a content identifier corresponding to the content and a user identifier. The at least one processor further includes a second module for saving the marker request, and a third module for determining a match between a requested content identifier and a requester identifier and the content identifier and the user identifier, respectively. The requested content identifier and the requester identifier correspond to a resume content request transmitted by a second communication device. Additionally, the at least one processor includes a fourth module for initiating a transmission of the marker information to a content server or to the second communication device if a match is determined, wherein the marker information is operable to initiate access to the content on the second communication device at the saved state of content on the first communication device.

In another aspect, an apparatus for managing access to electronic content comprises means for receiving a marker request initiated by a first communication device, wherein the marker request comprises marker information and data key information. The marker information represents a saved state of content on the first communication device, and the data key information comprises a content identifier corresponding to the content and a user identifier. The apparatus also includes means for saving the marker request, and means for determining a match between a requested content identifier and a requester identifier and the content identifier and the user identifier, respectively. The requested content identifier and the requester identifier correspond to a resume content request transmitted by a second communication device. Additionally, the apparatus includes means for initiating a transmission of the marker information to a content server or to the second communication device if a match is determined, wherein the marker information is operable to initiate access to the content on the second communication device at the saved state of content on the first communication device.

In still another aspect, a server system for managing access to electronic content comprises a communications module operable to receive a marker request initiated by a first communication device, wherein the marker request comprises marker information and data key information. The marker information represents a saved state of content on the first communication device, and the data key information comprises a content identifier corresponding to the content and a user identifier, wherein the communication module is further operable to receive a resume content request transmitted by a second communication device, wherein the resume content request comprises a requested content identifier and a requester identifier. The server system also includes a memory operable to save the marker request, and a marker module comprising a marker program operable to determine a match between the requested content identifier and the requester identifier and the content identifier and the user identifier, respectively. Additionally, the marker module is further operable to initiate a transmission of the marker information from the server system to a content server or to the second communication device if a match is determined, wherein the marker information is operable to initiate access to the content on the second communication device at the saved state of content on the first communication device.

In an aspect, a method of providing electronic content comprises receiving at a content server a resume content request transmitted by a second communication device, wherein the resume content request comprises a requested content identifier and a requester identifier. The method also includes sending a resume information request from the content server to a marker server based on the resume content request, wherein the resume information request comprises the requested content identifier and the requester identifier. Further, the method includes receiving marker information from the marker server based on the marker server determining a match between the requested content identifier and the requester identifier and marker information and data key information, respectively. The marker information and the data key information correspond to a marker request transmitted by a first communication device, wherein the marker information represents a saved state of content on the first communication device and wherein the data key information comprises a content identifier corresponding to the content and a user identifier. Additionally, the method includes transmitting information to the second communication device, wherein the information is operable to initiate access to the content on the second communication device at the saved state of content on the first communication device based on the marker information.

In another aspect, a computer program product for providing electronic content comprises a computer readable medium comprising instructions. The computer readable medium includes at least one instruction for causing a computer to receive a resume content request transmitted by a second communication device, wherein the resume content request comprises a requested content identifier and a requester identifier. Also, the computer readable medium includes at least one instruction for causing the computer to send a resume information request to a marker server based on the resume content request, wherein the resume information request comprises the requested content identifier and the requestor identifier. Further, the computer readable medium includes at least one instruction for causing the computer to receive marker information from the marker server based on the marker server determining a match between the requested content identifier and the requester identifier and marker information and data key information, respectively. The marker information and the data key information correspond to a marker request transmitted by a first communication device, wherein the marker information represents a saved state of content on the first communication device and wherein the data key information comprises a content identifier corresponding to the content and a user identifier. Additionally, the computer readable medium includes at least one instruction for causing the computer to transmit information to the second communication device, wherein the information is operable to initiate access to the content on the second communication device at the saved state of content on the first communication device based on the marker information.

In a further aspect, at least one processor configured to provide electronic content comprises a first module for receiving a resume content request transmitted by a second communication device, wherein the resume content request comprises a requested content identifier and a requester identifier. Also, the at least one processor includes a second module for sending a resume information request to a marker server based on the resume content request, wherein the resume information request comprises the requested content identifier and the requestor identifier. Further, the at least one processor includes a third module for receiving marker information from the marker server based on the marker server determining a match between the requested content identifier and the requester identifier and marker information and data key information, respectively. The marker information and the data key information correspond to a marker request transmitted by a first communication device, wherein the marker information represents a saved state of content on the first communication device and wherein the data key information comprises a content identifier corresponding to the content and a user identifier. Additionally, the at least one processor includes a fourth module for transmitting information to the second communication device, wherein the information is operable to initiate access to the content on the second communication device at the saved state of content on the first communication device based on the marker information.

In another aspect, an apparatus for providing electronic content comprises means for receiving a resume content request transmitted by a second communication device, wherein the resume content request comprises a requested content identifier and a requester identifier. Further, the apparatus includes means for sending a resume information request to a marker server based on the resume content request, wherein the resume information request comprises the requested content identifier and the requester identifier. The apparatus also includes means for receiving marker information from the marker server based on the marker server determining a match between the requested content identifier and the requester identifier and marker information and data key information, respectively. The marker information and the data key information correspond to a marker request transmitted by a first communication device, wherein the marker information represents a saved state of content on the first communication device and wherein the data key information comprises a content identifier corresponding to the content and a user identifier. Additionally, the apparatus includes means for transmitting information to the second communication device, wherein the information is operable to initiate access to the content on the second communication device at the saved state of content on the first communication device based on the marker information.

Yet another aspect includes a server for providing electronic content. The server comprises a communications module operable to receive a resume content request transmitted by a second communication device, wherein the resume content request comprises a requested content identifier and a requester identifier. Further, the server comprises a content module operable to generate a resume information request based on the resume content request for transmission to a marker server, wherein the resume information request comprises the requested content identifier and the requester identifier. Also, the communications module is further operable to receive marker information from the marker server based on the marker server determining a match between the requested content identifier and the requester identifier and marker information and data key information, respectively. The marker information and the data key information correspond to a marker request transmitted by a first communication device, wherein the marker information represents a saved state of content on the first communication device and wherein the data key information comprises a content identifier corresponding to the content and a user identifier. Additionally, the content module is further operable to initiate a transmission of information to the second communication device based on the marker information, wherein the information is operable to initiate access to the content on the second communication device at the saved state of content on the first communication device based on the marker information.

In an aspect, a method for accessing electronic content comprises accessing stored content at a first communication device, and generating a marker request at the first communication device. The marker request comprises marker information and data key information, wherein the marker information represents a saved state of content accessed on the first communication device and wherein the data key information comprises a content identifier corresponding to the content and a user identifier. Additionally, the method includes sending the marker request from the first communication device to a server system for use in subsequently providing access to the content, wherein the marker information is operable to initiate access to the content on a second communication device at the saved state of content on the first communication device.

In another aspect, a computer program product for accessing electronic content comprises a computer readable medium comprising instructions. The computer readable medium includes at least one instruction for causing a computer to access stored content at a first communication device, and at least one instruction for causing the computer to generate a marker request at the first communication device. The marker request comprises marker information and data key information, wherein the marker information represents a saved state of content accessed on the first communication device and wherein the data key information comprises a content identifier corresponding to the content and a user identifier. Additionally, the computer readable medium includes at least one instruction for causing the computer to send the marker request from the first communication device to a server system for use in subsequently providing access to the content, wherein the marker information is operable to initiate access to the content on a second communication device at the saved state of content on the first communication device.

In a further aspect, at least one processor configured to access electronic content comprises a first module for accessing stored content at a first communication device, and a second module for generating a marker request at the first communication device. The marker request comprises marker information and data key information, wherein the marker information represents a saved state of content accessed on the first communication device and wherein the data key information comprises a content identifier corresponding to the content and a user identifier. Additionally, the at least one processor includes a third module for sending the marker request from the first communication device to a server system for use in subsequently providing access to the content, wherein the marker information is operable to initiate access to the content on a second communication device at the saved state of content on the first communication device.

In still another aspect, an apparatus for accessing electronic content comprises means for accessing stored content at a first communication device, and means for generating a marker request at the first communication device. The marker request comprises marker information and data key information, wherein the marker information represents a saved state of content accessed on the first communication device and wherein the data key information comprises a content identifier corresponding to the content and a user identifier. Additionally, the apparatus includes means for sending the marker request from the first communication device to a server system for use in subsequently providing access to the content, wherein the marker information is operable to initiate access to the content on a second communication device at the saved state of content on the first communication device.

In a further aspect, a first communication device for accessing electronic content comprises a memory comprising a presentation manager module and content, and a processor operable to execute the presentation manager module to access the content in the memory. The processor is further operable to execute the presentation manager module to generate a marker request, wherein the marker request comprises marker information and data key information, wherein the marker information represents a saved state of content accessed on the first communication device and wherein the data key information comprises a content identifier corresponding to the content and a user identifier. Additionally, the processor is further operable to execute the presentation manager module to send the marker request from the first communication device to a server system for use in subsequently providing access to the content, wherein the marker information is operable to initiate access to the content on a second communication device at the saved state of content on the first communication device.

In an aspect, a method of accessing electronic content comprises transmitting a request to resume content from a second communication device to a server system, wherein the request to resume content comprises a requested content identifier and a requester identifier. Further, the method includes receiving information at the second communication device from the server system in response to the request to resume content, wherein the information is operable to initiate access to the content on the second communication device at a saved state of content on a first communication device based on a marker request generated by the first communication device. The marker request comprises marker information and data key information, wherein the marker information represents a saved state of content on the first communication device and wherein the data key information comprises a content identifier corresponding to the content and a user identifier. The receiving is based on the server system determining a match between the requested content identifier and the requester identifier of the request to resume content and the marker information and data key information of the marker request, respectively. Additionally, the method includes accessing the content on the second communication device at the saved state of content on the first communication device based on the marker information.

In yet another aspect, a computer program product for accessing electronic content comprises a computer readable medium comprising instructions. The computer readable medium includes at least one instruction for causing a computer to transmit a request to resume content from a second communication device to a server system, wherein the request to resume content comprises a requested content identifier and a requester identifier. Further, the computer readable medium includes at least one instruction for causing the computer to receive information at the second communication device from the server system in response to the request to resume content. The information is operable to initiate access to the content on the second communication device at a saved state of content on a first communication device based on a marker request generated by the first communication device. The marker request comprises marker information and data key information, wherein the marker information represents a saved state of content on the first communication device and wherein the data key information comprises a content identifier corresponding to the content and a user identifier. Further, receiving the information is based on the server system determining a match between the requested content identifier and the requester identifier of the request to resume content and the marker information and data key information of the marker request, respectively. Additionally, the computer readable medium includes at least one instruction for causing the computer to access the content on the second communication device at the saved state of content on the first communication device based on the marker information.

In an aspect, at least one processor configured for accessing electronic content comprises a first module for transmitting a request to resume content from a second communication device to a server system, wherein the request to resume content comprises a requested content identifier and a requester identifier. The at least one processor further includes a second module for receiving information at the second communication device from the server system in response to the request to resume content. The information is operable to initiate access to the content on the second communication device at a saved state of content on a first communication device based on a marker request generated by the first communication device. The marker request comprises marker information and data key information, wherein the marker information represents a saved state of content on the first communication device and wherein the data key information comprises a content identifier corresponding to the content and a user identifier. Further, receiving the information is based on the server system determining a match between the requested content identifier and the requester identifier of the request to resume content and the marker information and data key information of the marker request, respectively. Additionally, the at least one processor includes a third module for accessing the content on the second communication device at the saved state of content on the first communication device based on the marker information.

In another aspect, an apparatus for accessing electronic content comprises means for transmitting a request to resume content from a second communication device to a server system, wherein the request to resume content comprises a requested content identifier and a requester identifier. Further, the apparatus includes means for receiving information at the second communication device from the server system in response to the request to resume content, wherein the information is operable to initiate access to the content on the second communication device at a saved state of content on a first communication device based on a marker request generated by the first communication device. The marker request comprises marker information and data key information, wherein the marker information represents a saved state of content on the first communication device and wherein the data key information comprises a content identifier corresponding to the content and a user identifier. Receiving the information is based on the server system determining a match between the requested content identifier and the requester identifier of the request to resume content and the marker information and data key information of the marker request, respectively. Additionally, the apparatus includes means for accessing the content on the second communication device at the saved state of content on the first communication device based on the marker information.

In still another aspect, a second communication device for accessing electronic content comprises a memory comprising a presentation manager module operable to present content, and a processor operable to execute the presentation manager module to transmit a request to resume content to a server system, wherein the request to resume content comprises a requested content identifier and a requestor identifier. Further, the second communication device includes a communications module operable to receive information at the second communication device from the server system in response to the request to resume content, wherein the information is operable to initiate access to the content on the second communication device at a saved state of content on a first communication device based on a marker request generated by the first communication device. The marker request comprises marker information and data key information, wherein the marker information represents a saved state of content on the first communication device and wherein the data key information comprises a content identifier corresponding to the content and a user identifier. Receiving the information is based on the server system determining a match between the requested content identifier and the requestor identifier of the request to resume content and the marker information and data key information of the marker request, respectively. Additionally, the processor is further operable to execute the presentation manager module to access the content on the second communication device at the saved state of content on the first communication device based on the marker information.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to concisely describing these versions.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1:
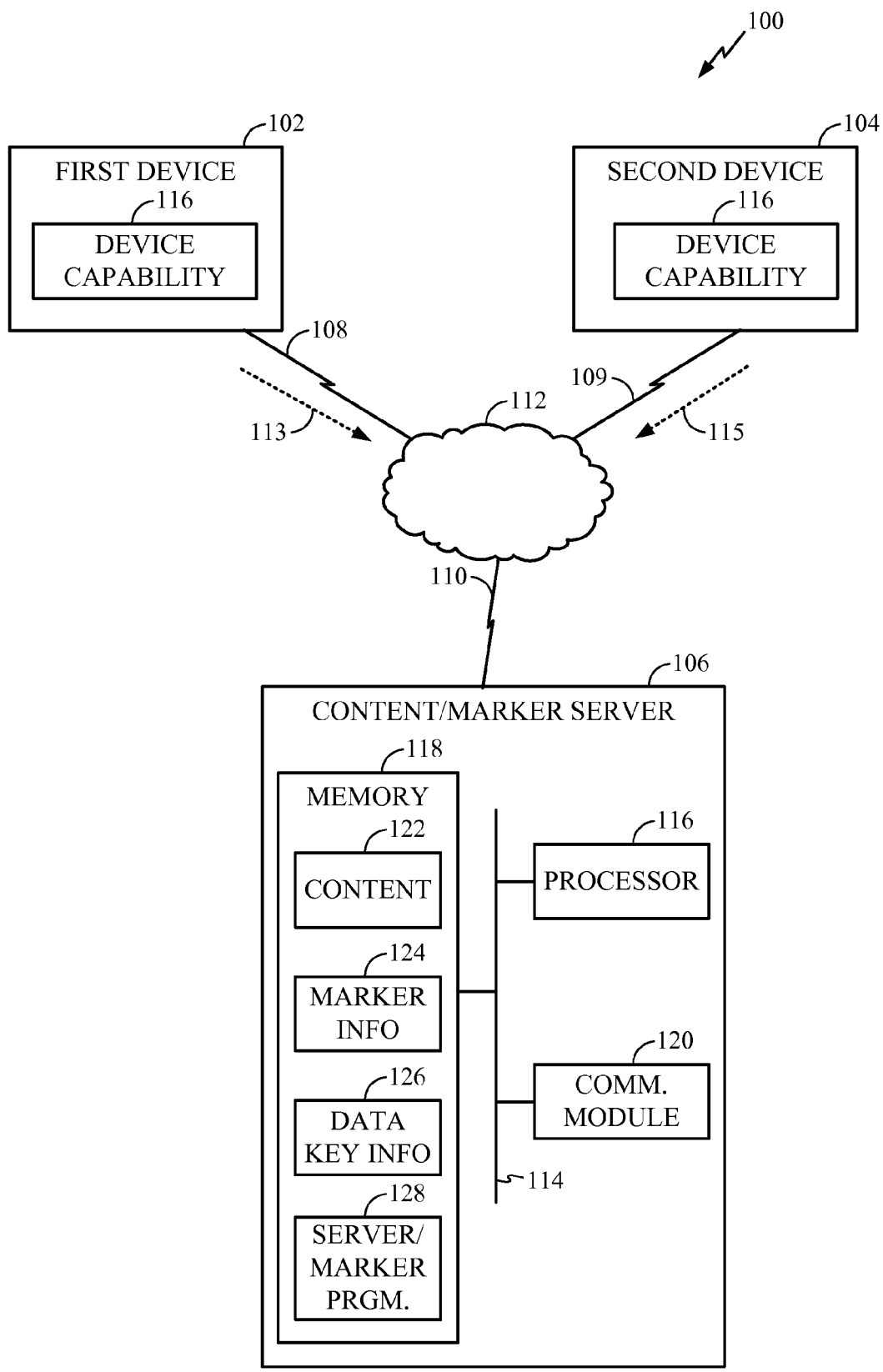
FIG. 1 is a schematic block diagram of a system for managing access to a portion of electronic content on a user device, according to one aspect.

Referring to FIG. 1, one aspect of a system 100 allows for managing access to, or for using, a portion of electronic content on a plurality of user devices. The system 100 comprises a first device 102 and a second device 104 that are communicable with a server 106, which may include a content server, a marker server, or both. System 100 enables consumption of at least a portion of content 122 by the first device 102, and marking the state of the consumption using marker information 124 and data key information 126, such that the state of the content 122 may be retrieved and consumption resumed on the second device 104. For example, in some aspects, the first device 102 is operable to send a marker request 113 to the server 106, where the marker request 113 includes the marker information 124 and the data key information 126. The marker information 124 represents a saved state of content on the first device and the data key information 126 includes a content identifier corresponding to the content and a user identifier. Subsequently, the second device 104 is operable to send a resume content request 115 to server 106 to resume accessing the content 122. In some aspects, for example, the resume content request 115 includes a requested content identifier and a requester identifier. The server 106 is operable to determine if a match exists between the requested content identifier and the requester identifier of the resume content request 115 and the content identifier and the user identifier of the marker request 113, respectively. If the server 106 determines a match exists, then the server 106 is operable to initiate a transmission of either the marker information 124 or the content 122 in the proper state to enable the second device 104 to access the content 122 at the same state as saved by the first device 102 based on the marker request 113. Thus, system 100 marks the end state of content consumption for subsequent retrieval on the same device or on a different device.

The first device 102 and the second device 104 can be any device that can communicate using any interface 108 and 109, respectively. For example, interfaces 108 and 109 may include a wireless interface, such as cellular, infrared, and BLUETOOTH, or a wired interface, such as a serial cable connection, or both. Device 102 and 104 can be, for example, a smart hand held device such as a mobile or cellular phone, a personal data assistant (PDA), a pager, a hand held gaming device, or other mini-computer. Additionally, the devices 102 and 104 can be a smart terminal, a laptop personal computer, and a desk top personal computer. These examples are not intended to be limiting, rather, they are common examples of devices having at least an output mechanism, such as a readable screen, processor, memory, and user interface such as a keyboard, a pointing device, and/or oral command capability. The second device 142 can be any of the same devices as the first device 102, or the first device 102 and the second device 142 can be different devices.

Further, each device 102 and 104 has a respective device capability 103 and 105. Device capability 103 and 105 may include a hardware capability, a software capability, or any combination of both. For example, a hardware capability or a software capability may include, but are not limited to, the hardware or software components on the respective device, the version of the respective component, and one or more component characteristics. Component characteristic may include, but is not limited to, a performance parameter of the respective component, such as a screen size for a display, a memory size for a memory, an audio synthesizer capability for a speaker, a speed of a processor, etc. The device capability 103 of first device 102 may be the same as, or may be different from, the device capability 105 of second device 104.

The server 106, via interface 110, can communicate with the first device 102 and the second device 104 through a network 112. The network 112 can be any network usable for communication between the first device 102, the second device 104 and the server 106, including but not limited to telecommunications networks such as terrestrial telephony, cellular telephony, satellite telephony, and packet data-based networks such as the Internet. Interface 110 can be wired or wireless, as noted above with respect to interfaces 108 and 109.

Although illustrated as a single server, server 106 may include a plurality of servers operable to perform the functionality described herein. For example, in some aspects, server 106 may include a content server operable to distribute content 122, such as software applications, games, music files, video files, ring tones, etc. Further, for example, server 106 may include a marker server operable to store marker information 124 and data key information 126 both relating to the state of content 122 with respect to one or both of first device 102 and second device 104. As such, server 106 may be referred to as content/marker server 106.

The content/marker server 106 may include a bus 114 communicatively connecting a processor 116, a memory 118, and a communications interface 120. In some aspects, the memory 118 stores electronic content 122, marker information 124, data key information 126 and a server/marker program 128. The serving program 128 is executable by the processor to serve content 122 to one or both of first device 102 and second device 104, as well as manage the state of content 122 via marker information 124 and data key information 126.

The processor 116 may be implemented on a programmed general purpose computer, on a special purpose computer, a programmed microprocessor, or microcontroller, on peripheral integrated circuit elements, a programmable logic device, or the like. In general, any device capable of implementing the steps shown in FIG. 7 can be used to implement the processor.

The memory 118 may be implemented using one or more of a hard disk drive, static RAM, dynamic RAM, ROM, flash memory, CD-ROM drive, floppy disk drive, and the like.

The communication interface 120 may include hardware and software operable to enable content/marker server 106 to communicate with other device, such as first device 102 and second device 104, across network 112. Additionally, communication interface 120 enables communications between components on content/marker server 106. Further, for example, communication interface 120 may include a user interface having one or more input mechanisms and one or more output mechanisms. For example, an input mechanism may include a keyboard, a mouse, microphone, a voice recognition program, etc., and an output mechanism may include a speaker, a display, a haptic feedback device, etc.

In one aspect, the system 100 acts as a way for a user to retrieve electronic content 122 onto a first device 102, utilize the content, and store on content/marker server 106 the marker information 124. For example, in some aspects, the electronic content 122 may be an electronic book or ebook, a magazine or ezine, or any other user readable content, such as a newspaper. In other aspects, the electronic content 122 can be a game or any other type of software program. Further, for example, in some aspects, the marker information 124 may be an electronic bookmark or any other indicator of a location within the electronic content 122 the user desires to remember. For example, the marker information 124 can be equivalent to a physical bookmark that is often used to remind a reader where he stopped reading a paper-based book, magazine or other document. In other aspects, marker information 124 may include an indicator of the last state of the electronic content 122.

In addition to the marker information 124, data key information 126 is utilized by first device 102 and/or second device 104 to retrieve and/or store electronic content 122. For example, data key information 126 may include, but is not limited to, one or any combination of information: identifying the electronic content 122; authorizing access to the respective content; identifying a format of the electronic content 122; identifying a required or suggested device capability or configuration for use in consuming the electronic content 122; identifying a device capability of a device identified to use the electronic content to enable re-formatting of the content, etc.

At another time, the user, accessing the electronic content 122 from the second device 104, is able to retrieve the electronic content 122 along with the marker information 124 that identifies the location within the electronic content 122 previously identified by the user, such as the location where the user stopped reading. Further, the second device 104 may supply or identify data key information 126 in order to authorize access to the respective electronic content 122 or enable retrieval of the electronic content 122 onto the second device 104, for example, in a proper format compatible with second device capability 105. After utilizing the electronic content 122, the second device 104 can transmit updated marker information 124, and in some aspects updated data key information 126, to content/marker server 106 in order to enable future retrieval of the electronic content 122 at the marked point of usage or at the last state of the electronic content 122.

Thus, in some aspects, system 100 allows for storing a marked point of consumption of electronic content 122. In other aspects, system 100 allows for saving a state of electronic content 122. In yet other aspects, system 100 allows for the retrieval of electronic content 122 at one device based on a consumption point or state marked by another device. Further, system 100 allows for the retrieval of electronic content 122 at one device based on a consumption point or state marked by another device, wherein the retrieved electronic content 122 is modified according to a device capability of the retrieving device.

Figure 2:
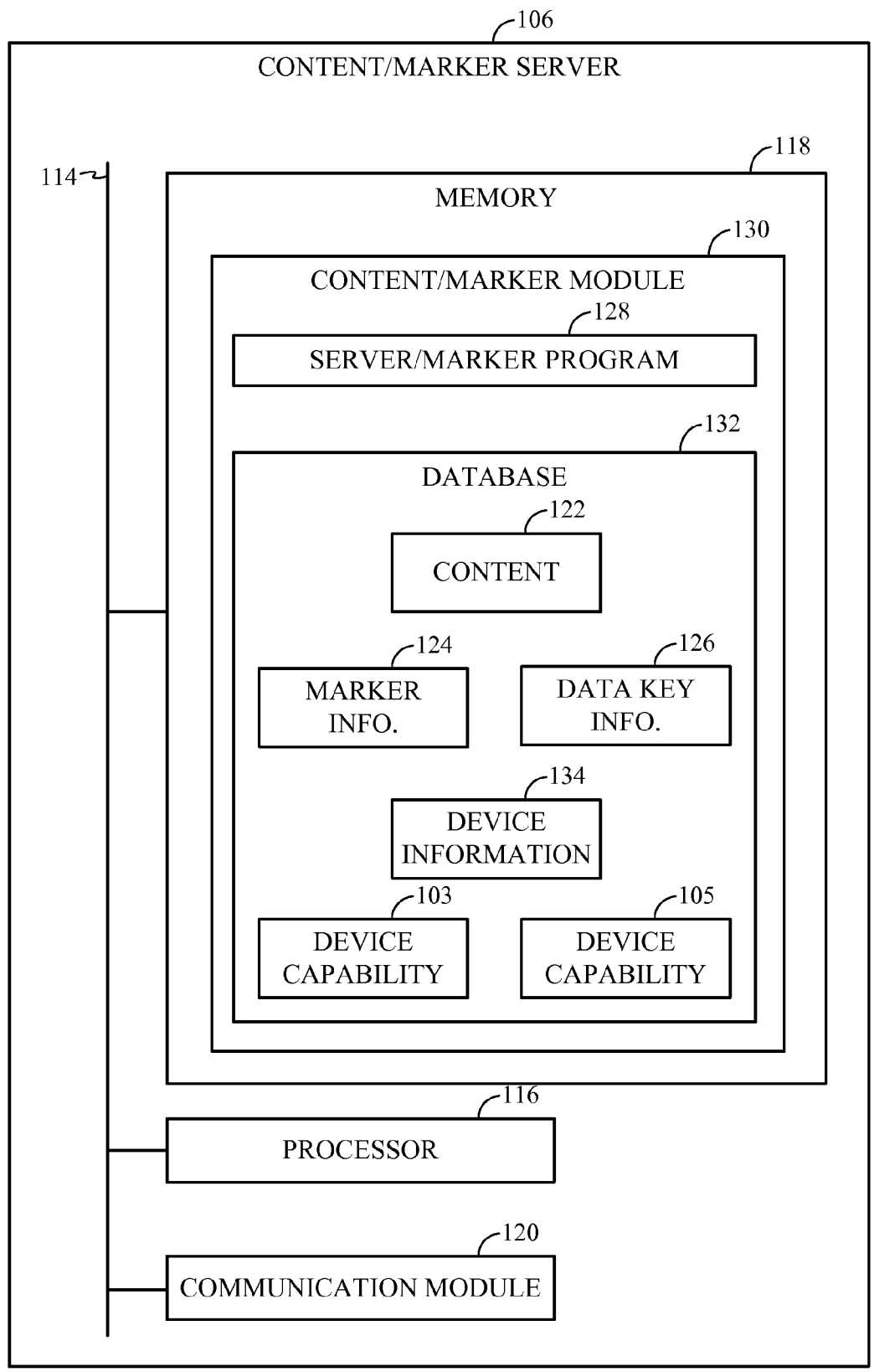
FIG. 2 is a block diagram of one aspect of the marker server of FIG. 1.

Referring to FIG. 2, in some aspects, the content/marker server 106 may further include a content/marker module 130. In some aspects, content/marker module 130 enables distribution of electronic content 122, such a with respect to the content server functionality described herein. In other aspects, content/marker module 130 enables the marking of the last consumption point or state of electronic content 122, such as with respect to the marker server functionality described herein. The content/marker module 130 may include or be associated with the server/marker program 128 described above, and optionally a database 132. The database 132 may be operable to store the electronic content 122 or a reference thereto, the marker information 124, the data key information 126, and device identification information 134 for one or more devices in system 100 (FIG. 1) as well as the corresponding device capability 103, 105, etc. The content/marker module 130 may include one or any combination of hardware, software, firmware, computer readable instructions, etc., operable to manage the content serving the marking functionality described herein.

Figure 3:
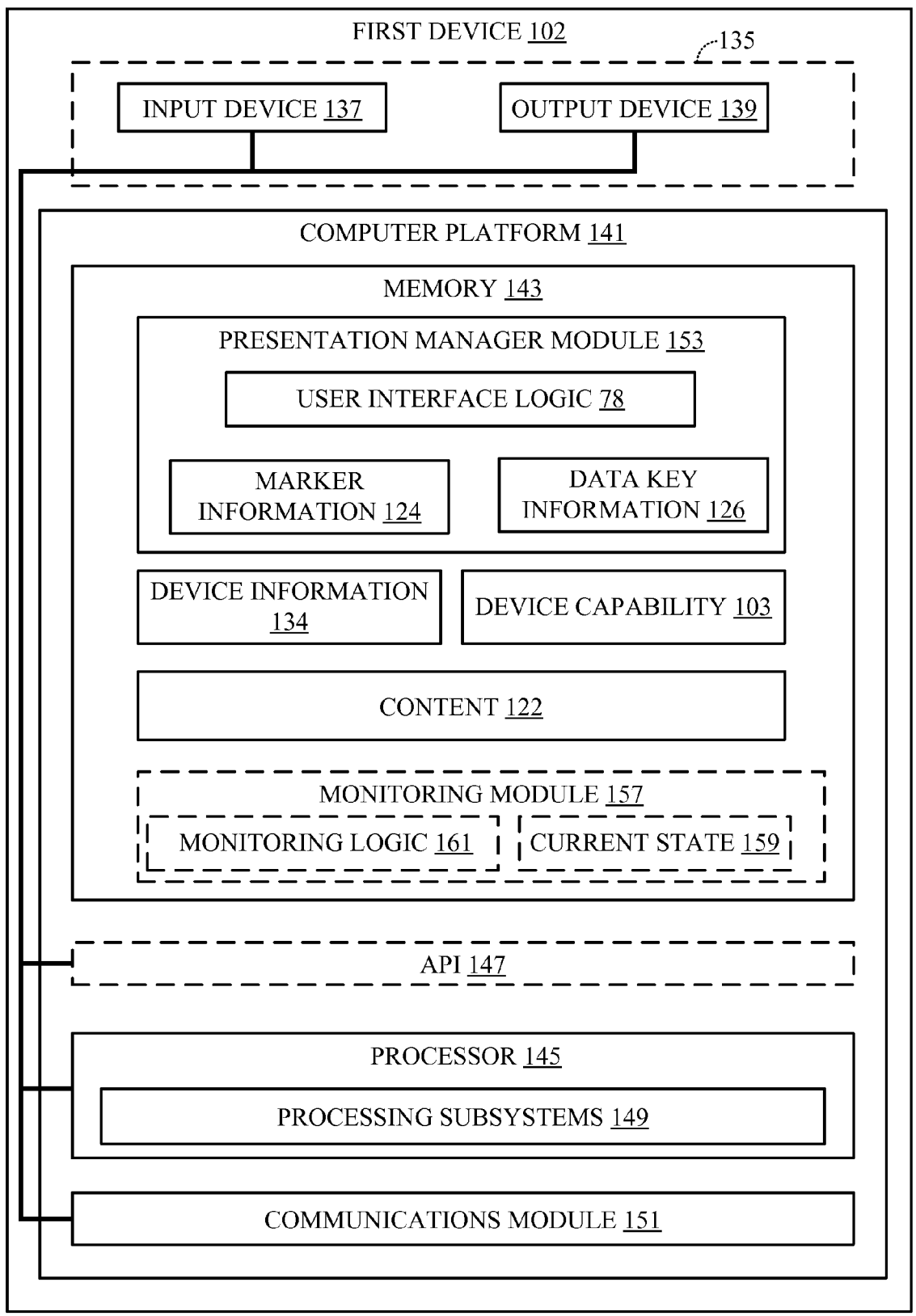
FIG. 3 is a schematic block diagram of one aspect of a communication device for use in the system of FIG. 1.

Additionally, referring to FIG. 3 (which, for simplicity, references first communication device 102), first communication device 102 and/or second communication device 104 may include a user interface 135 including an input device 137 operable to generate or receive an input into the device, and an output device 139 operable to generate and/or present information for consumption by the user of the device. For example, input device 137 may include at least one device such as a keypad and/or keyboard, a mouse, a touch-screen display, a microphone in association with a voice recognition module, etc. In certain aspects, input device 137 may provide for user input of a request for content or for user input of marking information. Further, for example, output device 139 may include a display, an audio speaker, a haptic feedback mechanism, etc. Output device 139 may generate a graphical user interface, a sound, a feeling such as a vibration, etc., and such outputs may be associated, for example, with the presentation of content 122.

Further, communication device 102 may include a computer platform 141 operable to execute applications to provide functionality to the device, and which may further interact with user interface 135. Computer platform 141 may include a memory 143, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory 143 may include active memory and storage memory, including an electronic file system and any secondary and/or tertiary storage device, such as magnetic media, optical media, tape, soft and/or hard disk, and removable memory components.

Further, computer platform 141 may also include a processor 145, which may be an application-specific integrated circuit (ASIC), or other chipset, processor, logic circuit, or other data processing device. In some optional aspects, as indicated by the dashed line, such as when first communication device 102 comprises a cellular telephone, processor 145 or other logic such as ASIC may execute an application programming interface (API) layer 147 that interfaces with any resident software components, such as voice call, data call, and media-related applications in memory 143. API 147 may be a runtime environment executing on the respective communication device. One such runtime environment is Binary Runtime Environment for Wireless® (BREW®) software developed by Qualcomm Incorporated of San Diego, Calif. Other runtime environments may be utilized that, for example, operate to control the execution of applications on wireless computing devices.

Additionally, processor 145 may include various processing subsystems 149 embodied in hardware, firmware, software, and combinations thereof, that enable the functionality of first communication device 102 and the operability of the communication device on communications network 112 (FIG. 1). For example, processing subsystems 149 allow for initiating and maintaining communications, and exchanging data, with other networked devices as well as within and/or among components of first communication device 102. In one aspect, such as in a cellular telephone, processor 145 may include one or a combination of processing subsystems 149, such as: sound, non-volatile memory, file system, transmit, receive, searcher, layer 1, layer 2, layer 3, main control, remote procedure, handset, power management, diagnostic, digital signal processor, vocoder, messaging, call manager, BLUETOOTH system, BLUETOOTH LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 149 of processor 145 may include any subsystem components that interact with applications executing on computer platform 141.

Computer platform 141 may further include a communications module 151 which enables communications among the various components of first communication device 102, as well as being operable to retrieve content 122, and transmit content requests and marking requests, between the first communication device 102 and the content/marker server 106 (FIG. 1) via communications network 112 (FIG. 1). Communications module 151 may be embodied in hardware, firmware, software, and/or combinations thereof, and may further include all protocols for use in intra-device and inter-device communications. Further, communications module 151 is operable to transmit and/or receive information, such as electronic content 122, marker information 124 and data key information 126, in accordance with the apparatus and methods described herein.

Additionally, in some aspects, memory 143 (FIG. 3) may further store content 122. Content 122 may comprise text, video, graphics, or animation, and in general, any data that may be stored on and interacted with by a user of first communications device 102.

Further, in some aspects, memory 143 may further store presentation manager module 153 operable to retrieve, present, and mark an ending point or state of content 122 stored in memory 143. Presentation manager module 153 may comprise one or any combination of hardware, software, firmware, data, and executable instructions operable to perform these functions. For example, in some aspects, presentation manager module 153 may comprise user interface logic 155 operable to interface between user interface 135 and presentation manager module 153 in order to present outputs, such as a graphical menu, a sound, content 122, etc., to the user of the respective device, and in order to prompt the user to enter inputs, such as a retrieve content request, a move within content request such as a scroll, a page turn, etc., a mark content request, a save marker/state information request, and generally any content retrieval and marking functionality described herein. As such, presentation manager module 153 may further include or have access to data key information 126 for use in retrieving electronic content 122 from content/marker server 106. Optionally, presentation manager module 153 may further include or have access to device capability 103 in order to retrieve content 122 in a proper format based on the respective device capability 103, or to reformat content 122 for presentation on user interface 135 after retrieval from content/marker server 106. Further, presentation manager module 153 may further be operable to transmit a marker request to mark the last use point of use or state of content 122 with respect to device information 134, and/or based on device capability 103.

Additionally, in some aspects, memory 141 of first communication device 102 may further comprise a monitoring module 157 operable to store a current state 159 of a presentation of content 122 on an on-going basis for use by presentation manager module 153 in generating marker information 124. Monitoring module 157 may comprise one or any combination of hardware, software, firmware, data, and executable instructions operable to perform these functions. For example, in some aspects, monitoring module 157 may comprise monitoring logic 161 operable to store the actions of the first communication device 102 with respect to content 122, thereby representing the current state 159 of the content 122 on the first device 102. The actions of the communication device 102 include data that tracks the state or use point in content 122.

Figure 4:
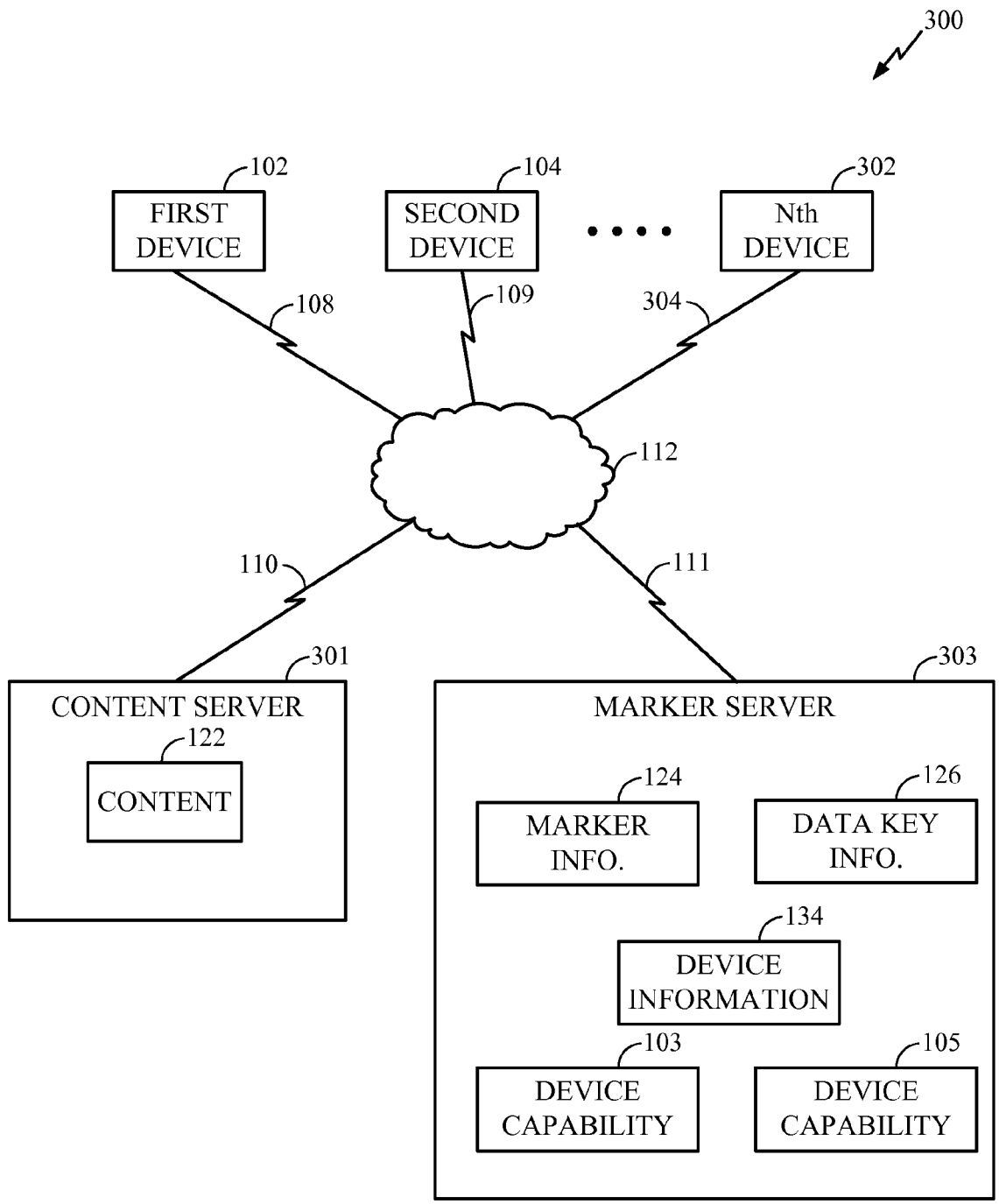
FIG. 4 a schematic block diagram of another aspect of a system for managing access to a portion of electronic content on a user device.

FIG. 4 depicts another aspect of a system for managing access to or use of a portion of electronic content on a user device. In this figure, like numbers refer to like components discussed previously. The system 300 is similar to FIG. 1, except that the functionality of content/marker server 106 (FIG. 1) is separated between a content server 301 from which content 122 is downloaded and a marker server 303 operable to manage the marking of the last point of use or state of content 122 on a respective device, and enabling retrieval of the marking information by another device. For example, marker server 303 may include the marker-related aspects of content/marker module 103 (FIG. 2), as discussed previously. System 300 comprises the first device 102 that is communicable with the content server 301 via interfaces 108 and 110, and with marker server 303 via interfaces 108 and 111 (which is the same or a similar interface as 110), both through network 112. As shown, any number, N. of devices 302 that can communicate using an interface 304 can be used, where interface 304 is the same or similar to interfaces 108 and 109.

In FIG. 3, the content server 104 may be a server that distributes any type of content 122, such as an e-book server that contains e-book content. In operation, the user using the first device 102 retrieves the content 122 from the content server 301, for example using data key information 126 and/or device capability information 103 resident on first device 102, reads a portion of the content 122, and sends marker information 124 and the corresponding data key information 126 to the marker server 303 to enable future initiation of the content 122 at the marked point of state of the content 122. Subsequently, a user using any one of first device 102, second device 104 or Nth device 302 may retrieve the marker information 124 and the corresponding data key information 126 stored on the marker server 303 to re-initiate consumption of the content 122 at the marked point or state. In some aspects, marker server 303 may utilize device capability information 103 or 105 corresponding to the respective device to enable the content 122 to be formatted for use by the respective device. For example, in some aspects, marker server 303 may communicate with content server 301 upon the initial or upon subsequent requests for the content 122 to provide the content server 301 with the device capability. Further, in other aspects, the marker server 301 may acquire and store the content 122 for each device and then transmit the content 122 to the respective device 102, 104, or 302 in a proper format depending on the respective device capability, such as 103 or 105.

Figure 5:
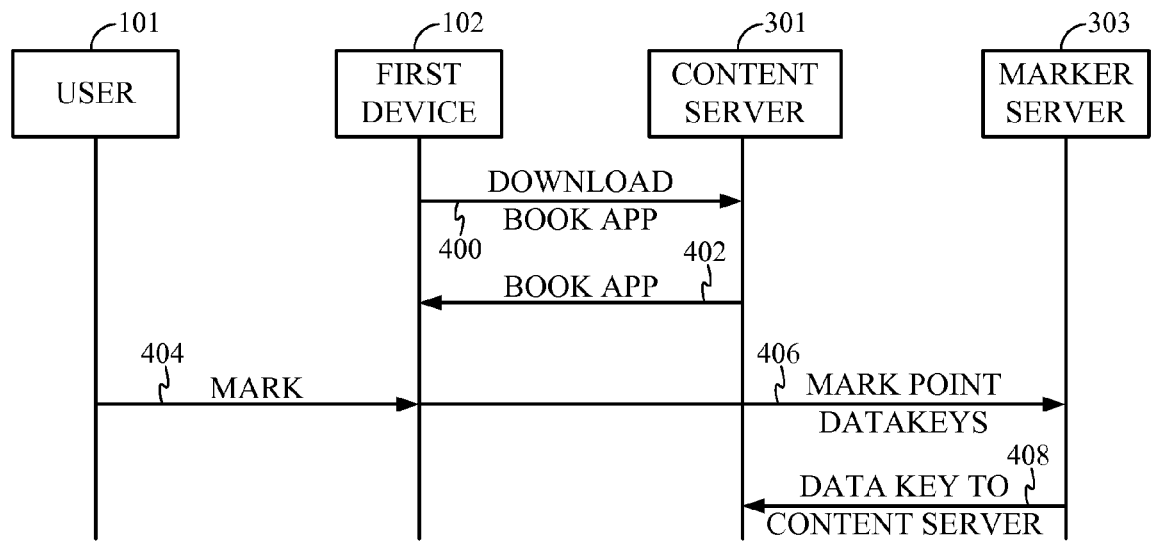
FIG. 5 is a message sequence diagram of one aspect of a communications sequence between a user, a first device, an application server, and a marker server.
Figure 6:
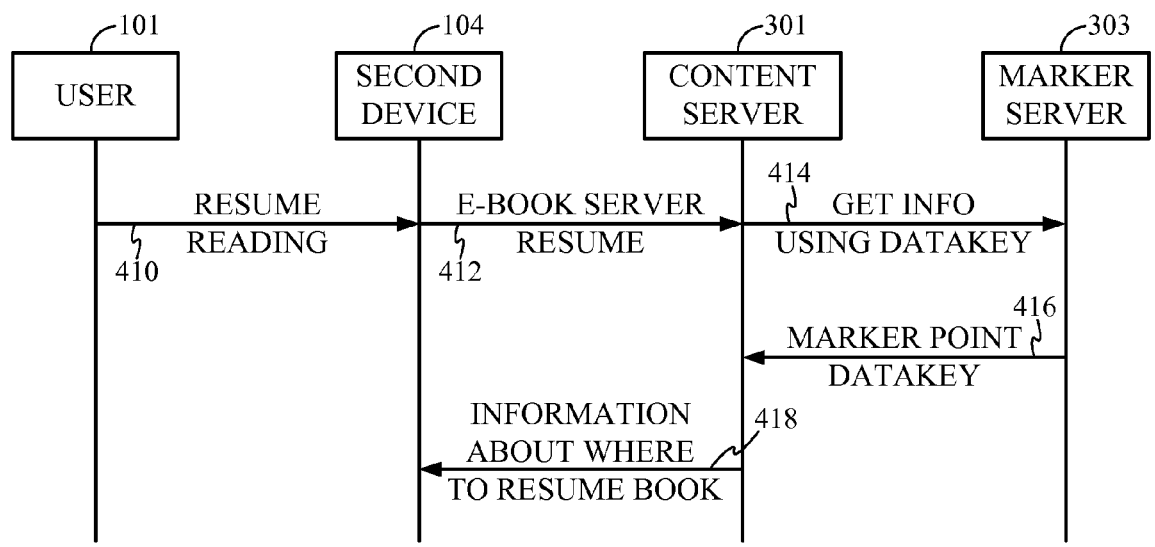
FIG. 6 is a message sequence diagram of one aspect of a communications sequence between a user, a second device, the application server, and the marker server.

Referring to FIGS. 5 and 6, in one aspect, a method of operation of system 300 includes a sequence of communications between a user 101, a first device 102, a second device 104, a content server 301 such as an ebook server, and a marker server 303. The message sequence involves a user utilizing content up to a first marked point, saving the marked point, and subsequently initiating access to the content based on the saved marked point. By way of example, a user reads text-based content, such as an ebook, and when the user stops reading at some location within the content, the user saves the last read location as a marked location. When the user desires to resume reading, the user initiates access to the ebook at the last read location based on the saved marker information. For example, if the last read location is the end of a chapter, then the initiated access could be at the beginning of the next chapter.

In one non-limiting example of using an electronic book or ebook, user 101 inputs a content request 399 into first device 102 that generates a message 400 sent by a first device 102 to the content server 301 requesting that a book application be downloaded to the first device 102. The server 301 receives and processes the message 400, and through message 402 sends the book application to the first device 102. When the user 101 desires to bookmark a location within the ebook, the user, through a user interface of the first device 102, inputs a message 404 to mark the ebook location. The first device 102 then sends a message 406 to the marker server 303 to mark the point within the ebook. The message 406 may also contain information identifying the ebook, as well as the data key information that authorize a user to access the information. Additionally, the data key information may include information about the format of the ebook, that is, the format may vary depending on the type of user device, allowing the user to access the ebook on a different device that requires different formatting.

In some optional aspects, the marker server 303 may then sends a message 408 to the content server 301 containing the data key information and/or the marker information. In some aspects, for example, the data key information includes information that identifies where in marker server 303 the marker information can be found, or other information regarding the marker point, for example, the point marked, the state of the content, the type of the first device, device capabilities of the first device, and the like. The content server 301 receives the message 408 and stores the information.

Referring to FIG. 6, subsequently, the user 101, desiring to continue reading the ebook at a second device 104, through a user interface of the second device 104, inputs a message 410 to resume reading. The second device 104 receives the user message 410 and sends a message 412 to the content server 3041 to resume reading the ebook. The content server 301 receives the message 412 to resume reading the ebook, and utilizes the resident data key and marker information or retrieves the data key and marker information that may be stored on the marker server 303.

For example, the content server 301 sends a message 414 to the marker server 303 to retrieve the marker information and any other related information using the data key information. The marker server 303 receives the message 414, and retrieves the marker information and any other related information and sends this information in message 416 to the content server 301.

Content server 301 receives message 416 and processes the marker information. The content server 301 then sends message 418 to the second device 142, for example including the content 122 and/or containing information about where to resume reading the ebook. It is understood that the message 418 may contain only the portion of the ebook beginning with the bookmarked location. For example, if the bookmark is at page 53, paragraph 3, then the message 418 may only contain the ebook beginning at page 53.

Figure 7:
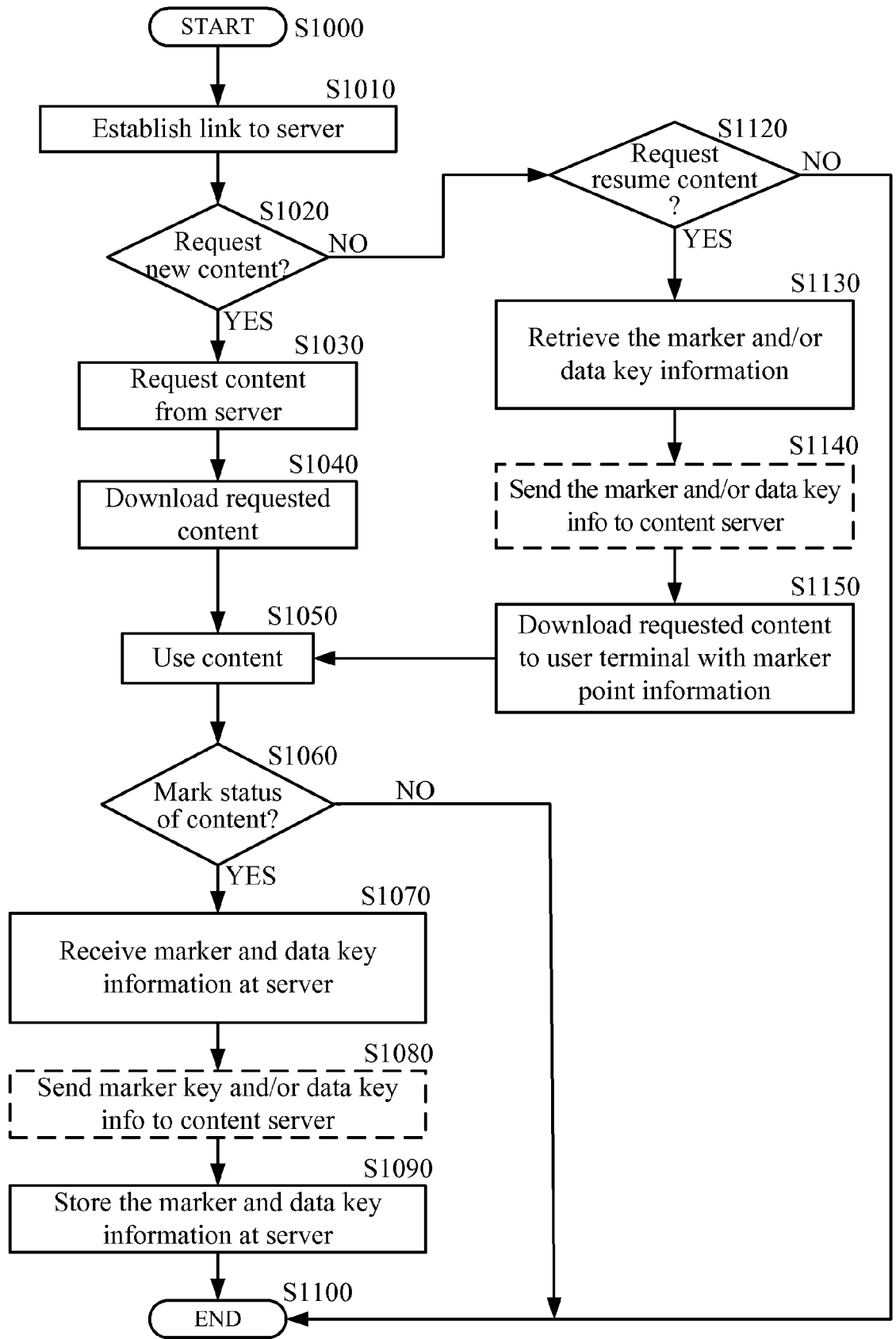
FIG. 7 is a flowchart outlining one aspect of a method for managing access to a portion of electronic content on a user device.

Referring to FIG. 7, in one aspect, a method for managing access to or use of a portion of electronic content on a user device begins with step S1000 and continues to step S1010. In step S1010, a communications link is established between the first device and a server having content, and continues to step S1020. In step S1020, a determination is made whether new content is to be requested from the server. If new content has been requested, the process continues to step S1030.

In step S1030, the message requesting content is received at the server for processing. Next, in step S1040, the requested content is downloaded from the server and sent to the first device. Next, in step S1050, the downloaded content is loaded onto the first device and the user uses the content. In step S1060, a determination is made whether to mark the status of the content, if no marker information such as a bookmark is to be defined, then the process ends at step S1100. If the content is to be marked, then the process continues with step S1070. In step S1070, the device being used by the user sends a marker message to the server, the marker message including the marker-related information and data key information. Optionally, in the case where separate marker and content servers are utilized, at step S1080, the marker server sends at least one of the marker-related information and data key information to the content server. Next, at step S1090, the server stores the marker-related information and data key information, and this portion of the process ends at step S1100.

Returning to step S1020, if there was no request for new content, then the process continues to step S1120. In step S1120, a determination is made whether there is a request to resume consumption of previously-obtained content. If there is no request to resume content, then the process ends at step S1100. If there is a request to resume content, then the process continues with step S1130. In this step, the request for resuming content may include information identifying the content and identifying the device and/or device capabilities of the requesting device.

In step S1130, the server retrieves the marker and data key information for the identified content and/or for the identified device. Optionally, in the case where separate marker and content servers are utilized, at step S1140, the marker server retrieves the marker information and/or data key information, and sends the marker information and/or data key information to the content server. Next, in step S1150, the server downloads the requested content based on or with the marker information to the user device, and continues to step S1050, where the content is used.

It is understood that this process allows a user to bookmark a place in a content. In some aspects, the content is stored on a first server, and the bookmark is stored on a second server, and that the first server stores information allowing the first server to access the bookmark on the second server. Further, it is understood that this process allows the user can resume the content from the same or another user terminal based on the marker information.

It is also understood that, in one aspect, the content is an electronic book.

It is also understood that in another aspect the content is a game. In this aspect, a user from a first user terminal can play a game, and place a bookmark of the status of the game on a marker server. At another time, the user, or another user, using the same user device or another user device, can access the same game and the bookmark. In this manner, the user, or another user, using the same or different user device, can resume the game at the bookmarked point of play and further based on the device capabilities of the respective device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of managing access to electronic content, comprising:
receiving at a server system a marker request initiated by a first communication device via a wireless communication protocol, wherein the marker request comprises marker information and data key information, the marker information represents a saved state of content on the first communication device, the content being previously downloaded from a content server via the wireless communication protocol on the first communication device, and the data key information comprises: a content identifier corresponding to the content and a user identifier, and information for authorizing access to the content;
saving the marker request at the server system;
determining a match between a requested content identifier and a requestor identifier and the content identifier and the user identifier, respectively, wherein the requested content identifier and the requestor identifier correspond to a resume content request transmitted by a second communication device;
initiating a transmission of the marker information from the server system to the content server or to the second communication device if the match is determined, wherein the marker information is operative to initiate an access to the content at the saved state of content downloaded on the second communication device from the content server via the wireless communication protocol;
receiving at the server system first device capability information corresponding to the first communication device and second device capability information corresponding to the second communication device, the first and second device capability information relating to hardware or software components on the first and second devices, respectively, a version of each respective hardware or software component, and one or more component characteristics indicating a performance parameter of each respective hardware or software component including one or more of a screen size for a display, a size for each associated memory, an audio synthesizer capability for a speaker, or a speed of each associated processor;
reformatting the content by the server system for presentation on the second communication device based at least on the second device capability information; and
in response to the resume content request, transmitting a portion of the reformatted content by the server system for presentation on the second communication device starting at the saved state indicated in the marker information.

2. The method of claim 1, further comprising:
transmitting content formatting information from the server system to the content server or to the second communication device, wherein the content formatting information is based on at least a portion of the second device capability information affecting a presentation of the content on the second communication device.

3. The method of claim 1, further comprising:
adjusting the marker information based on a difference between the first device capability information and the second device capability information, wherein the difference corresponds to at least a portion of the second device capability information affecting a presentation of the content on the second communication device,
wherein initiating the transmission of the marker information further comprises initiating transmission of the adjusted marker information from the server system to the content server or to the second communication device.

4. The method of claim 1, wherein receiving the marker information further comprises receiving at least one of a game status or a location in an electronically readable document.

5. A non-transitory computer readable medium, comprising instructions for causing a computer of a server system to:
receive a marker request initiated by a first communication device via a wireless communication protocol, wherein the marker request comprises marker information and data key information, the marker information represents a saved state of content on the first communication device, the content being previously downloaded from a content server via the wireless communication protocol on the first communication device, and the data key information comprises: a content identifier corresponding to the content and a user identifier, and information for authorizing access to the content;

save the marker request;

determine a match between a requested content identifier and a requestor identifier and the content identifier and the user identifier, respectively, wherein the requested content identifier and the requestor identifier correspond to a resume content request transmitted by a second communication device;

initiate a transmission of the marker information to the content server or to the second communication device if the match is determined, wherein the marker information is operative to initiate an access to the content at the saved state of content downloaded on the second communication device from the content server via the wireless communication protocol;

receive first device capability information corresponding to the first communication device and second device capability information corresponding to the second communication device, the first and second device capability information relating to hardware or software components on the first and second devices, respectively, a version of each respective hardware or software component, and one or more component characteristics indicating a performance parameter of each respective hardware or software component including one or more of a screen size for a display, a size for each associated memory, an audio synthesizer capability for a speaker, or a speed of each associated processor;

reformat the content for presentation on the second communication device based at least on the second device capability information; and in response to the resume content request, transmit a portion of the reformatted content for presentation on the second communication device starting at the saved state indicated in the marker information.

6. At least one hardware processor configured to manage access to electronic content, the at least one hardware processor of a server system being configured for:

receiving a marker request initiated by a first communication device via a wireless communication protocol, wherein the marker request comprises marker information and data key information, the marker information represents a saved state of content on the first communication device, the content being previously downloaded from a content server via the wireless communication protocol on the first communication device, and the data key information comprises: a content identifier corresponding to the content and a user identifier, and information for authorizing access to the content;

saving the marker request;

determining a match between a requested content identifier and a requestor identifier and the content identifier and the user identifier, respectively, wherein the requested content identifier and the requestor identifier correspond to a resume content request transmitted by a second communication device;

initiating a transmission of the marker information to the content server or to the second communication device if the match is determined, wherein the marker information is operative to initiate an access to the content at the saved state of content downloaded on the second communication device from the content server via the wireless communication protocol;

receiving first device capability information corresponding to the first communication device and second device capability information corresponding to the second communication device, the first and second device capability information relating to hardware or software components on the first and second devices, respectively, a version of each respective hardware or software component, and one or more component characteristics indicating a performance parameter of each respective hardware or software component including one or more of a screen size for a display, a size for each associated memory, an audio synthesizer capability for a speaker, or a speed of each associated processor;

reformatting the content for presentation on the second communication device based at least on the second device capability information; and in response to the resume content request, transmitting a portion of the reformatted content for presentation on the second communication device starting at the saved state indicated in the marker information.

7. A server system for managing access to electronic content, the server system being configured to:

receive a marker request initiated by a first communication device via a wireless communication protocol, wherein the marker request comprises marker information and data key information, the marker information represents a saved state of content on the first communication device, the content being previously downloaded from a content server via the wireless communication protocol on the first communication device, and the data key information comprises: a content identifier corresponding to the content and a user identifier, and information for authorizing access to the content; and receive a resume content request transmitted by a second communication device, the resume content request comprises a requested content identifier and a requestor identifier; and a memory configured to save the marker request;

wherein the server system is further configured to:

determine a match between the requested content identifier and the requestor identifier and the content identifier and the user identifier, respectively, and initiate a transmission of the marker information from the server system to the content server or to the second communication device if the match is determined, wherein the marker information is operative to initiate an access to the content at the saved state of content downloaded on the second communication device from the content server via the wireless communication protocol;

receive first device capability information corresponding to the first communication device and second device capability information corresponding to the second communication device, the first and second device capability information relating to hardware or software components on the first and second devices, respectively, a version of each respective hardware or software component, and one or more component characteristics indicating a performance parameter of each respective hardware or software component including one or more of a screen size for a display, a size for each associated memory, an audio synthesizer capability for a speaker, or a speed of each associated processor;

reformat the content for presentation on the second communication device based at least on the second device capability information; and in response to the resume content request, transmit a portion of the reformatted content for presentation on the second communication device starting at the saved state indicated in the marker information.

8. The server system of claim 7, wherein the server system is further configured to:

transmit content formatting information to the content server or to the second communication device, wherein the content formatting information is based on at least a portion of the second device capability information affecting a presentation of the content on the second communication device.

9. The server system of claim 7, wherein the server system is further configured to:

adjust the marker information based on a difference between the first device capability information and the second device capability information, wherein the difference corresponds to at least a portion of the second device capability information affecting a presentation of the content on the second communication device, and wherein the marker information further comprises the adjusted marker information.

10. The server system of claim 7, wherein the marker information further comprises at least one of a game status or a location in an electronically readable document.

* * * * *